United States Patent [19]

Domer et al.

[11] 4,060,331
[45] Nov. 29, 1977

[54] SPHERICAL COUPLINGS FOR VEHICLE TOWING OR KINDRED PURPOSES

[75] Inventors: Michel Domer, Montigny-les-Cormeilles; Jean-Yves Haÿ, Colombes, both of France

[73] Assignee: Societe Paulstra, France

[21] Appl. No.: 688,490

[22] Filed: May 21, 1976

[30] Foreign Application Priority Data

May 28, 1975 France .................. 75.16664
Jan. 7, 1976 France .................. 76.00243

[51] Int. Cl.² .......................................... F16D 1/12
[52] U.S. Cl. ............................... 403/130; 280/511
[58] Field of Search ............. 403/56, 90, 122, 128, 403/130, 132; 280/483, 511, 512, 513

[56] References Cited

U.S. PATENT DOCUMENTS

| | | | |
|---|---|---|---|
| 1,868,818 | 7/1932 | Eksergian | 403/132 X |
| 2,861,501 | 11/1958 | Strelakos | 403/128 X |
| 3,017,209 | 1/1962 | Thomas | 403/130 |
| 3,521,900 | 7/1970 | Sakai | 403/128 X |
| 3,694,006 | 9/1972 | Good et al. | 280/511 X |

Primary Examiner—Wayne L. Shedd
Attorney, Agent, or Firm—Larson, Taylor and Hinds

[57] ABSTRACT

A ball-joint coupling comprises a male coupling member and a female coupling member. The male coupling member includes a ball to which a layer of elastomeric material is bonded. A part-spherical cap is received on the ball over said elastomeric layer and is bonded to such layer. The female coupling member has a part-spherical socket to receive the cap. Retaining means are operative between the cap and the female coupling member to prevent relative rotation of the cap in the socket at least in the horizontal plane, so that relative movement between the male and female coupling member results in deformation of the elastomeric layer and consequent damping of the movement.

12 Claims, 8 Drawing Figures

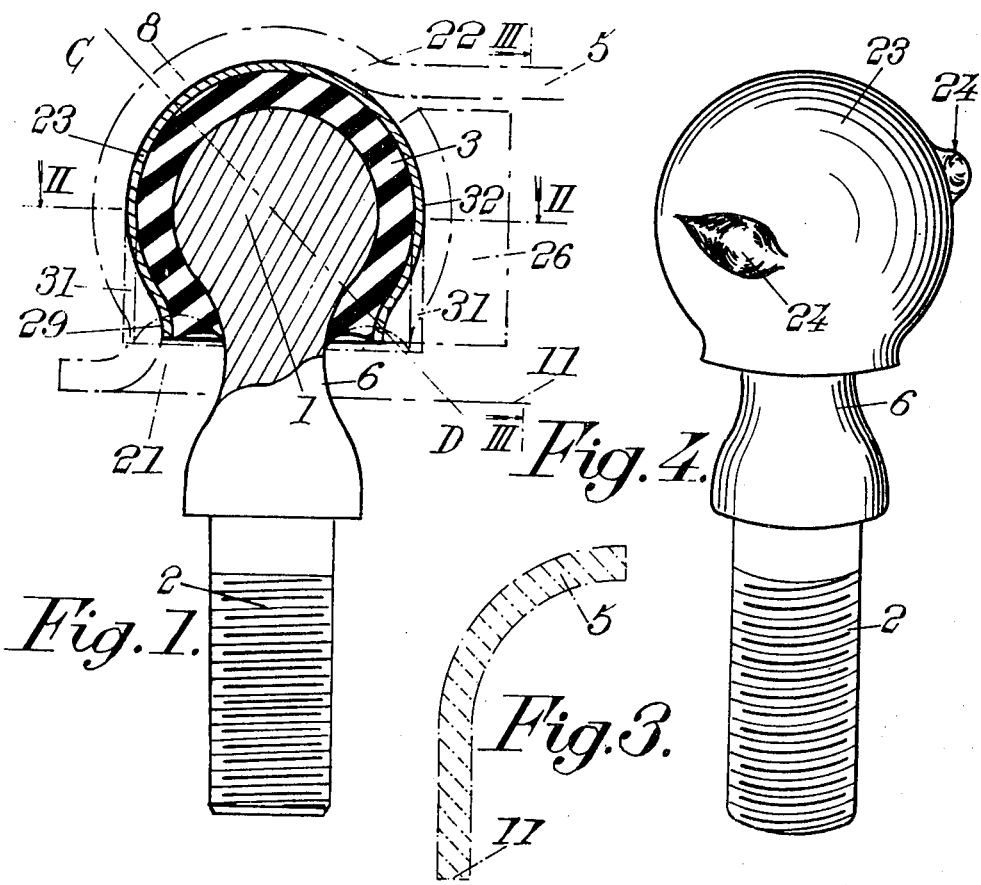
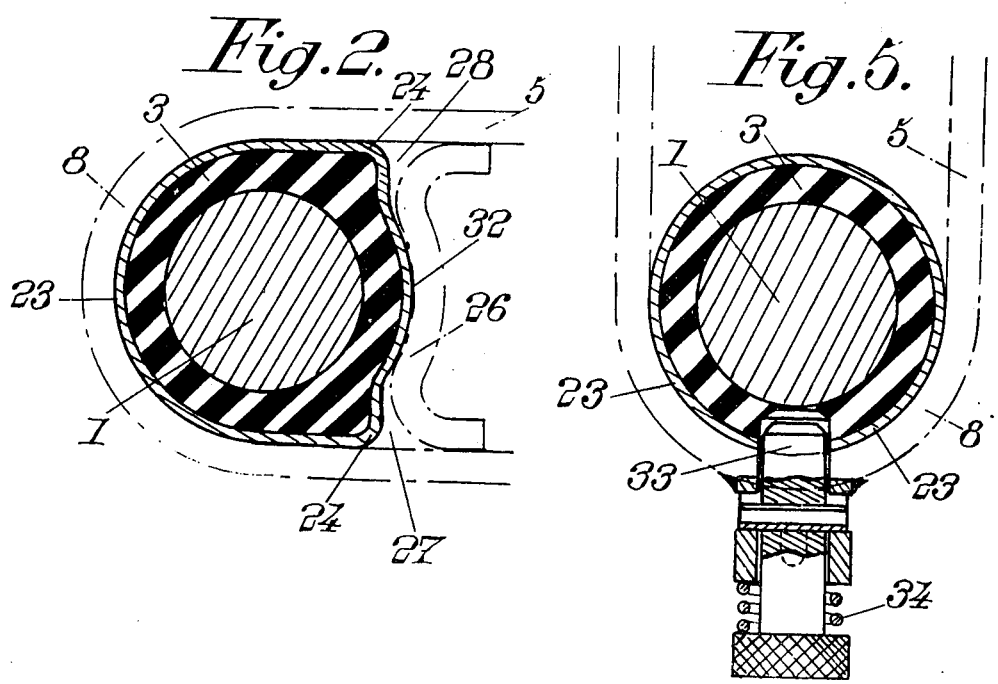

4,060,331

SPHERICAL COUPLINGS FOR VEHICLE TOWING OR KINDRED PURPOSES

BACKGROUND OF THE INVENTION

The invention relates to a ball-joint coupling comprising a male coupling member provided with a ball and a female coupling member having a socket to receive the ball, such coupling finding particular application in the hitching of trailers or caravans to motor or other vehicles.

Prior art couplings of this kind have various disadvantages. They are noisy because of their clearances and the resulting jerks during towing or braking. In addition, they permit the trailer or caravan too much freedom, in that they do not prevent it from pitching, rolling or swaying.

Various improvements have been proposed to obviate these disadvantages, but the previously proposed means are usually expensive and provide only partial solutions to the problem. More particularly, it has been proposed to cover the ball with a rubber layer, but the prior art arrangement proposed to this end is bulky and increases the difficulty of coupling and uncoupling the female coupling member or hitch co-operating with the ball.

SUMMARY OF THE INVENTION

The invention aims to provide novel means for overcoming the disadvantages of the known couplings, such means considerably simplifying coupling and uncoupling whilst being inexpensive and easily interchangeable with existing balls and hitches.

According to the invention, a layer of elastomeric material is bonded on the ball of the male coupling member and a part-spherical cap is received on said ball over the elastomeric layer to which the cap is also bonded, the female coupling member having a part-spherical socket to receive the cap, and retaining means operative between the cap and the female coupling member being provided to prevent relative rotation of the cap in the socket at least in the horizontal plane.

Consequently, the female coupling member or hitch cannot move relative to the ball of the male coupling member except by deforming, more particularly shearing, the elastomeric, e.g. rubber, layer. The assembly and dismantling of the female coupling member with respect to the ball and cap are also facilitated.

According to an advantageous embodiment the retaining means for holding the cap in the socket comprise means, such as a shoe, engaging in the female coupling member, which is channel-shaped, so as to engage the cap and prevent it rotating, at least in the horizontal plane. To this end, the cap comprises projections adapted to abut the shoe laterally.

In another embodiment, a stud is borne by the socket of the female coupling member for engagement in an aperture in the cap. If the stud is releasably mounted, the ball can be completely freed when desired, e.g. for parking or garaging operations.

The invention comprises another feature whereby the ball can be released in all cases for the aforementioned parking or garaging operations; in this feature, a cylindrical tail on the ball is not permanently secured to a structure, such as a vehicle, but is secured by mounting means comprising a holder adapted to be secured to the vehicle and having a cylindrical recess to receive the tail, the holder being provided with a locking device having an operative condition in which said tail is prevented from rotating and an inoperative condition enabling free rotation of the tail in accordance with the position of the hitch, without straining the elastomer.

Other removable securing means can be provided according to the invention between the ball and hitch.

In all cases, the rubber adhering to the facing surfaces of the ball and cap is preferably prestressed during assembly.

In addition to these features, the invention comprises other features which are preferably applied at the same time and will be described in greater detail hereinafter.

Further features and advantages of the invention will appear from the following description of preferred embodiments, given with reference to the appended drawings.

BRIEF DESCRIPTION OF THE DRAWINGS

FIGS. 1 to 3 show a coupling embodying the invention, FIG. 1 being a vertical section along the hitch bar and FIGS. 2 and 3 being respective cross-sections along lines II—II and III—III of FIG. 1;

FIG. 4 is a perspective view of the ball of the coupling of FIGS. 1 to 3 with the associated cap mounted thereon;

FIG. 5 is a horizontal section through another embodiment;

DESCRIPTION OF PREFERRED EMBODIMENTS

Figure 6:
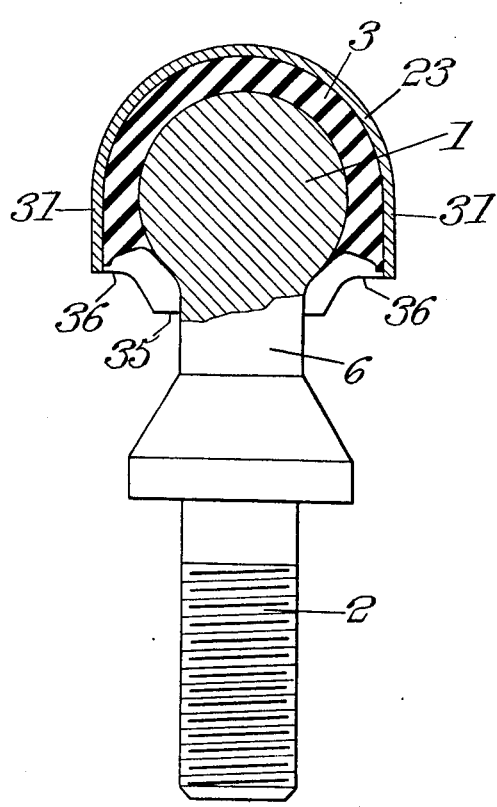
FIGS. 6 and 7 show an edge of another form of cap in vertical section and in a developed view respectively.

The drawings illustrate, by way of example, a ball joint coupling for hitching a motor vehicle and a trailer or caravan together.

The coupling comprises a male coupling member having a ball 1, provided e.g. in conventional manner at the end of a tail 2 borne at the rear of the vehicle, inter alia in a vertical direction. The ball 1 is covered with at least one layer of rubber or other elastomer and is coupled to a female coupling member or hitch bar of the trailer, so that relative motion of the male and female coupling members is accompanied by deformation and shearing of the rubber.

To this end, a rubber layer 3 is stuck to the useful spherical part of ball 1 and also to the inner surface cap 23, which may be made of metal and is mounted so as to be driven, during its relative motion, by the female coupling member or hitch bar 5.

The embodiment shown in FIGS. 1 to 3 illustrates the case where the hitch bar 5 is channel-shaped and has a front part-spherical socket 8 partially surrounding a neck 6 of the ball at 21 and secured to a corresponding flange of a skirt 11 terminating a rear part-cylindrical portion of hitch 5. The top of the spherical cap 22 may project slightly above the top end of the cylindrical portion.

In the same embodiment, the cap 23 is a hemisphere having a downwardly depending cylindrical skirt 31 whereby it can be fitted on to the ball during assembly, after which skirt 31 is hammered in at 29 so that the cap grips and prestresses the rubber 3, which sticks to the facing surfaces of the ball and cap. Of course, the entire device is adapted to fit as closely as possible within the corresponding part-spherical socket 8 of the hitch.

After the thus-prepared ball has been introduced into the socket 8, it is locked in position by a shoe such as 26, which is hollowed at 32 so as to press against the corresponding spherical part of the cap, the locking operation being in the vertical direction of the hitch bar, owing to the spherical portions 21 and 22. The assembly can easily be released in corresponding manner by moving away the shoe, which is appropriately guided inside hitch bar 5.

The cap 23 also comprises means for preventing any sliding by rotation in a horizontal plane. The means are e.g. two projections such as 24, preferably obtained by stamping and adapted to be located in apertures 27, 28 (FIG. 2) remaining between cap 23 and the edges of shoe 26.

In this manner, the cap is rigidly secured to the hitch, irrespective of any rolling, pitching or swaying of the trailer with respect to the towing vehicle. Consequently, as in the embodiment in FIGS. 1 and 3, all these relative movements tend to shear the rubber 3, and are thus damped.

Other removable means may be provided for securing the hitch bar with respect to the cap 23. For example, as shown in FIG. 5, use can be made of a catch 33 which is loaded by a spring 34 and is adapted to penetrate into an aperture in cap 23, the device preferably being adapted to act at the top of the ball in an oblique plane such as CD in FIG. 1.

A catch of this kind, which may if required replace projections 24, is, as in the previous embodiment, a particularly convenient locking and unlocking means, inter alia for parking operations, where it is advantageous to obtain momentary release so as to allow rotation without difficulty.

Figure 7:
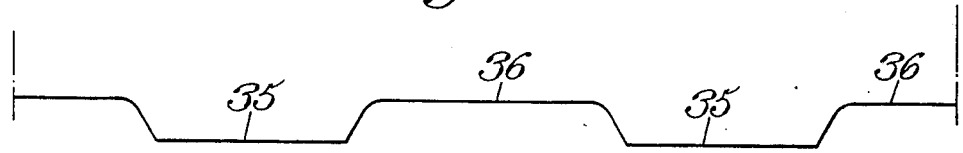

FIGS. 6 and 7 show another form of the cap 23 in which the bottom edge 35 of the skirt of the cap 23 comprises recesses 36 at 180°, which are suitably disposed so as to facilitate changes in angular orientation between the cap and the ball neck 6, in the case of wide angles deflections, e.g. when the vehicle enters or leaves a steep garage ramp, thus preventing bumps which might tear the rubber.

The coupling of the invention gives the following technical results.

The elastomer layer 3 prevents any noise due to impacts when towing or braking, by means of an assembly which can easily be adapted and locked on to the ball and cap. In addition, unlocking for parking or other operations is very easy.

Furthermore, rolling, pitching and swaying movements are very efficiently damped.

As is known, swaying is frequently the result of pitching and rolling of the caravan. In the present case, the last-mentioned two oscillations are damped as soon as they appear, thus preventing swaying under the most favourable conditions or delaying its appearance.

Tests on conventional vehicles showed that swaying which normally occurs at 120 km/h was delayed up to values of 150 km/h and more.

To some extent, the return torque of the resilient spherical joint during pitching re-distributes the load on the front axle of the towing vehicle and on the caravan axle, thereby tending to re-align the assembly horizontally.

Finally, the assembly is particularly easy to produce, since there is no difficulty in manufacturing and positioning the cap.

In order to facilitate parking operations, which are made possible by the releasable catch in the embodiment in FIG. 5, a further embodiment of the invention provides a feature whereby the rubber layer can be completely freed from stress whenever desired.

Figure 8:
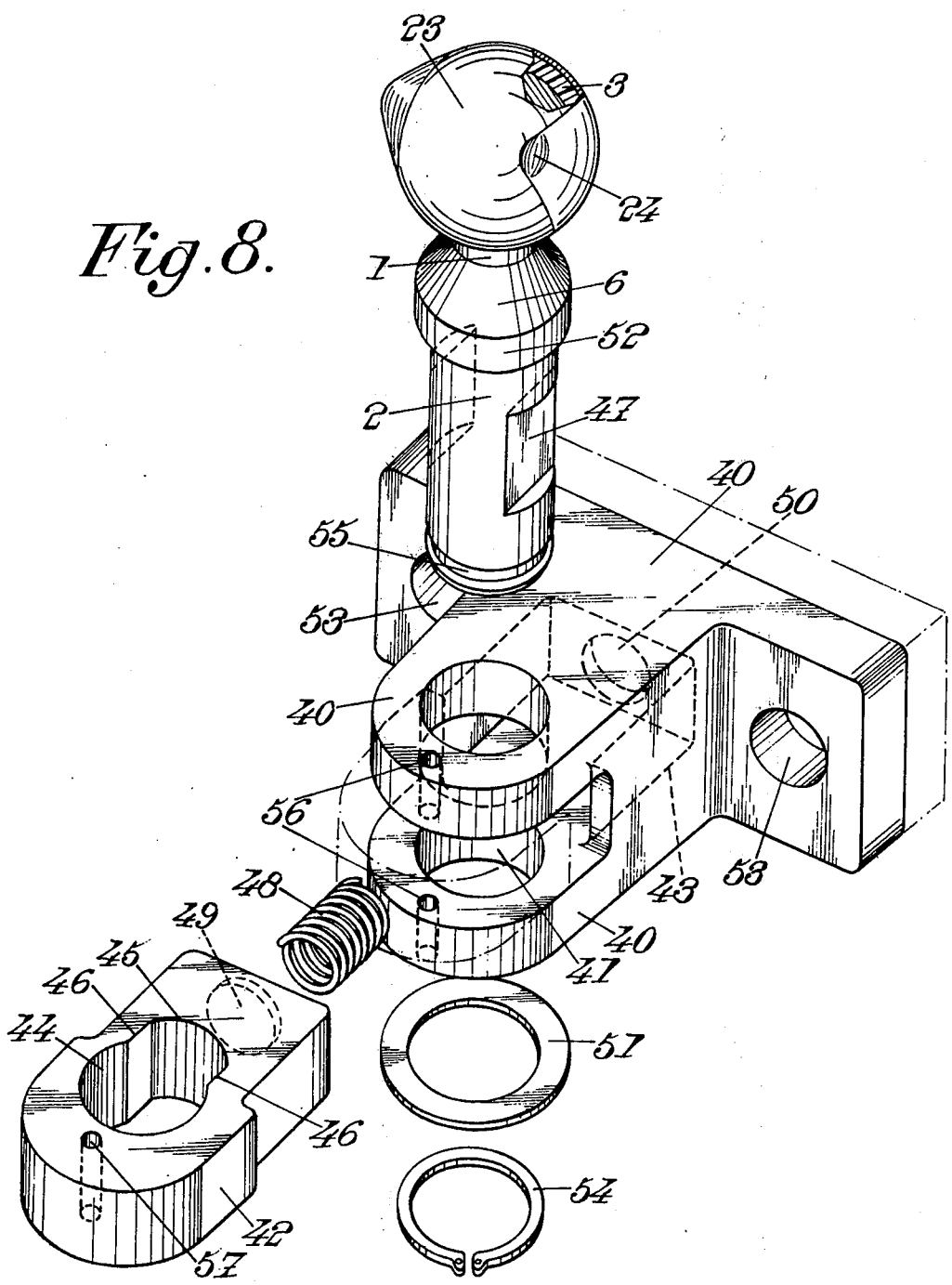
FIG. 8 is a perspective view of a further embodiment of the invention.

According to this last-mentioned feature, which is illustrated in FIG. 8, the tail 2 of the ball is not permanently connected to the vehicle chassis, but is introduced into a holder such as a bracket, yoke or the like 40, to which it can be secured when desired, or released so as to rotate on its axis.

This result can be obtained in various ways, inter alia in the manner shown by way of example only in FIG. 8.

In FIG. 8, the cylindrical tail 2 on the ball extends through a cylindrical recess 41 formed in holder 40, which is provided with a locking device or bolt 42 which is introduced, inter alia by sliding, into a cavity 43 formed inside member 40.

Bolt 42 has an aperture through which tail 2 passes, such aperture having a cylindrical portion 44 which substantially matches the tail diameter (with sufficient clearance). The aperture of bolt 42 also has a substantially prismatic prolongation 45 having two opposite flat surfaces 46 adapted to cooperate with two matching flats 47 on the tail.

The bolt is associated with resilient means which normally tend to bring the bolt into an operative position in which is prevents tail 2 from rotating, owing to the cooperation between flats 47 and surfaces 46. The resilient means are e.g. a coil or other spring 48 disposed between end face 49 of the bolt and end face 50 of the cavity 43.

In addition, means can be provided for holding the tail in its axial operating position in the holder 40, the means being e.g. a circlip 54 adapted to cooperate with a groove 55 at the base of tail 2, in combination with a washer 51. Towards the end provided with the ball, tail 2 also has an abutment coller 52.

When holder 40 has been secured by any appropriate means to the chassis or to a corresponding part thereof at 53, the assembly operates as follows.

In the normal operative position, tail 2 engages in holder 40 and is in a relative angular position determined by the engagement of flats 47 and faces 46, the unit being held in this position by spring 48. In this operative position, when the socket of the hitch bar is suitably coupled to cap 23, i.e. the socket is secured to the cap by projections 24 and a shoe such as shoe 26 in FIGS. 1 to 4, the entire device operates in the manner described, i.e. by shearing the rubber layer 3 as a result of changes in orientation between the hitch bar and the vehicle.

Accordingly, bolt 42 facilitates the actual hitching operations and the uncoupling operations and garage manoeuvres.

Uncoupling, irrespective of the orientation of the trailer relative to the vehicle and the corresponding return torque on the rubber, can be brought about by pressing in bolt 42 sufficiently to bring the tail into the cylindrical portion 44 of the bolt aperture. In this inoperative position of the bolt 42 the ball, which was initially locked by the flats 47 and the return torque of the rubber, is released for uncoupling or garage manoeuvres.

To achieve coupling, when not in line, the ball is released and oriented substantially on the axis of the trailer bar. The ball then automatically moves into the socket of the hitch bar. In addition, the bolt returns automatically to the locking position, owing to the return spring 48, as soon as the hitch is aligned.

Of course, any additional manual or other means could be provided to facilitate the motion of bolt 42 during operation. More particularly, the bolt may be remote-controlled by hydraulic or pneumatic means, directly from the dashboard of the towing vehicle.

Holes 56, 57 can be formed in holder 40 and bolt 42 to receive a vertical pin which retains bolt 42 in its inoperative pressed in position, thus releasing the ball so that it can rotate for the purpose of exceptional garaging operations.

Accordingly, irrespective of the embodiment used, ball-joint couplings can be constructed which have numerous advantages over similar prior-art devices, inter alia the following:

They effectively prevent rolling, pitching or swaying motion of a towed structure.

They are easily adjusted to render the elastomeric layer inoperative during all manoeuvres where such an effect is desirable.

We claim:

1. A ball-joint coupling comprising: a male coupling member provided with a ball; a layer of elastomeric material bonded on said ball; a part-spherical cap received on said ball over said elastomeric layer and bonded to said layer; a female coupling member having a part-spherical socket for releasably receiving said cap; and retaining means, acting between said cap and said female coupling member, for preventing relative rotation of said cap in said socket at least in the horizontal plane.

2. A coupling as claimed in claim 1, wherein said female coupling member is a channel-shaped member which terminates at one end in said socket.

3. A coupling as claimed in claim 2, wherein said female coupling member has a hemi-spherical cross-section prolonged by downwardly extending vertical flanges.

4. A coupling as claimed in claim 2, wherein said retaining means comprise a shoe mounted in said female coupling member and projections on said cap abutting said shoe.

5. A coupling as claimed in claim 1, further comprising interengaging means on said cap and said socket operative to oppose relative movement of said cap in said socket in vertical planes.

6. A coupling as claimed in claim 5, wherein said cap is a hemisphere having a downwardly depending skirt which is inwardly deformed to follow the shape of said ball, said interengaging means comprising a re-entrant flange on said socket engaging said deformed skirt.

7. A coupling as claimed in claim 1, wherein said retaining means are releasable to permit relative rotation of said cap in said socket in the horizontal plane.

8. A coupling as claimed in claim 1, wherein said retaining means comprise a catch mounted on said socket for engagement in an aperture in said cap.

9. A coupling as claimed in claim 8, wherein said catch extends in an oblique diametral plane of said cap.

10. A coupling as claimed in claim 8, wherein said catch is releasably biased into engagement in the aperture of said cap by a spring.

11. A coupling as claimed in claim 1, wherein said male coupling member comprises a tail on said ball, said cap being a hemisphere having a downwardly depending skirt which has a free edge formed with recesses to enable said female coupling member to move relative to said male coupling member through a considerable angle in the vertical plane without said skirt engaging said tail.

12. A coupling as claimed in claim 1, wherein said male coupling member comprises a cylindrical tail on said ball, said coupling further comprising mounting means for mounting said tail on a structure to be provided with said male coupling member, said mounting means comprising a holder adapted to be secured to said structure and having a cylindrical recess to receive said tail, said holder being provided with a locking device having an operative condition in which said tail is prevented from rotating and an inoperative condition enabling free rotation of said tail.

* * * * *